May 8, 1956 J. M. BENDOT 2,744,670
APPARATUS FOR FILLING CONTAINERS
Filed May 29, 1952 4 Sheets-Sheet 1
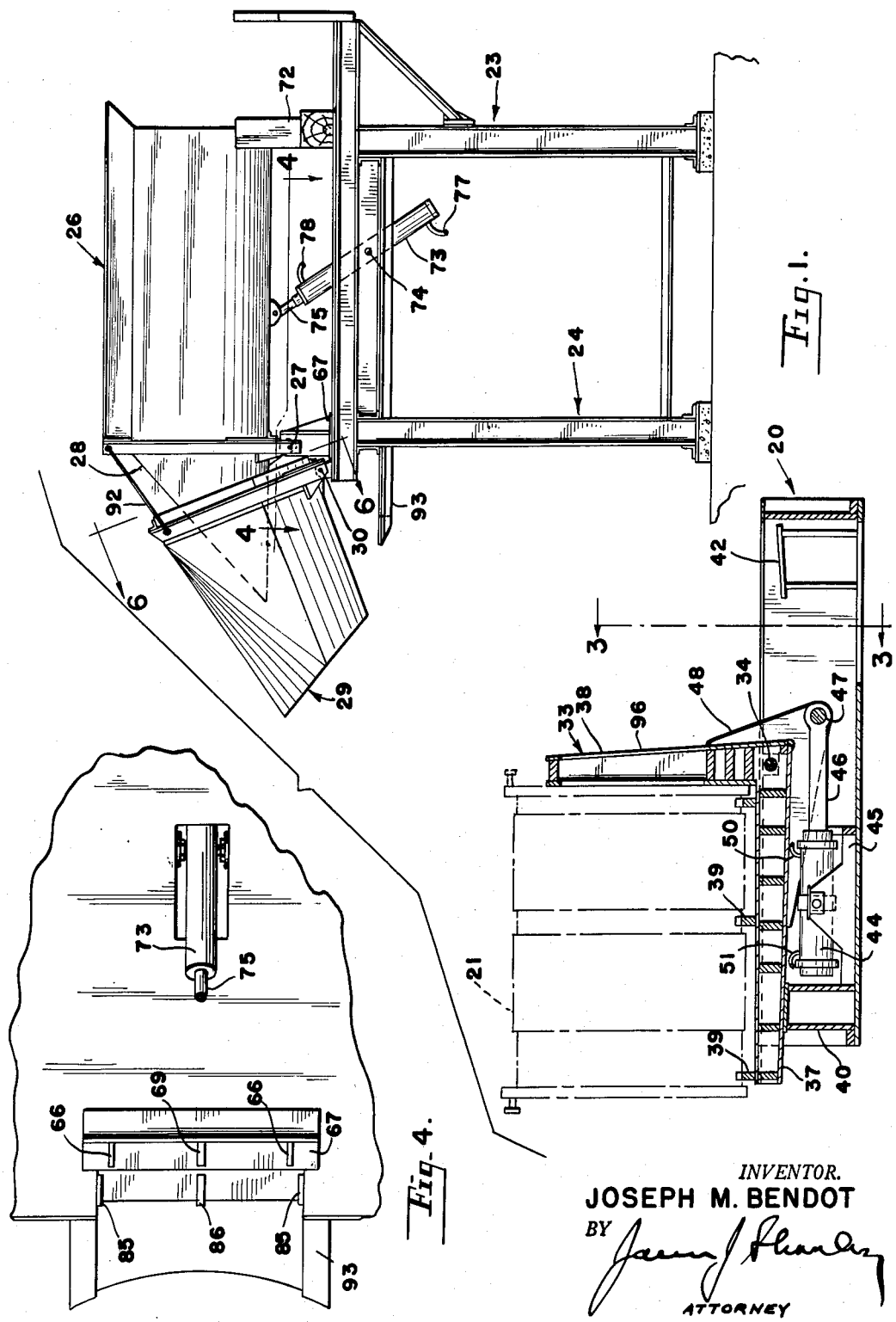
INVENTOR.
JOSEPH M. BENDOT
BY
ATTORNEY May 8, 1956 J. M. BENDOT 2,744,670
APPARATUS FOR FILLING CONTAINERS
Filed May 29, 1952 4 Sheets-Sheet 2
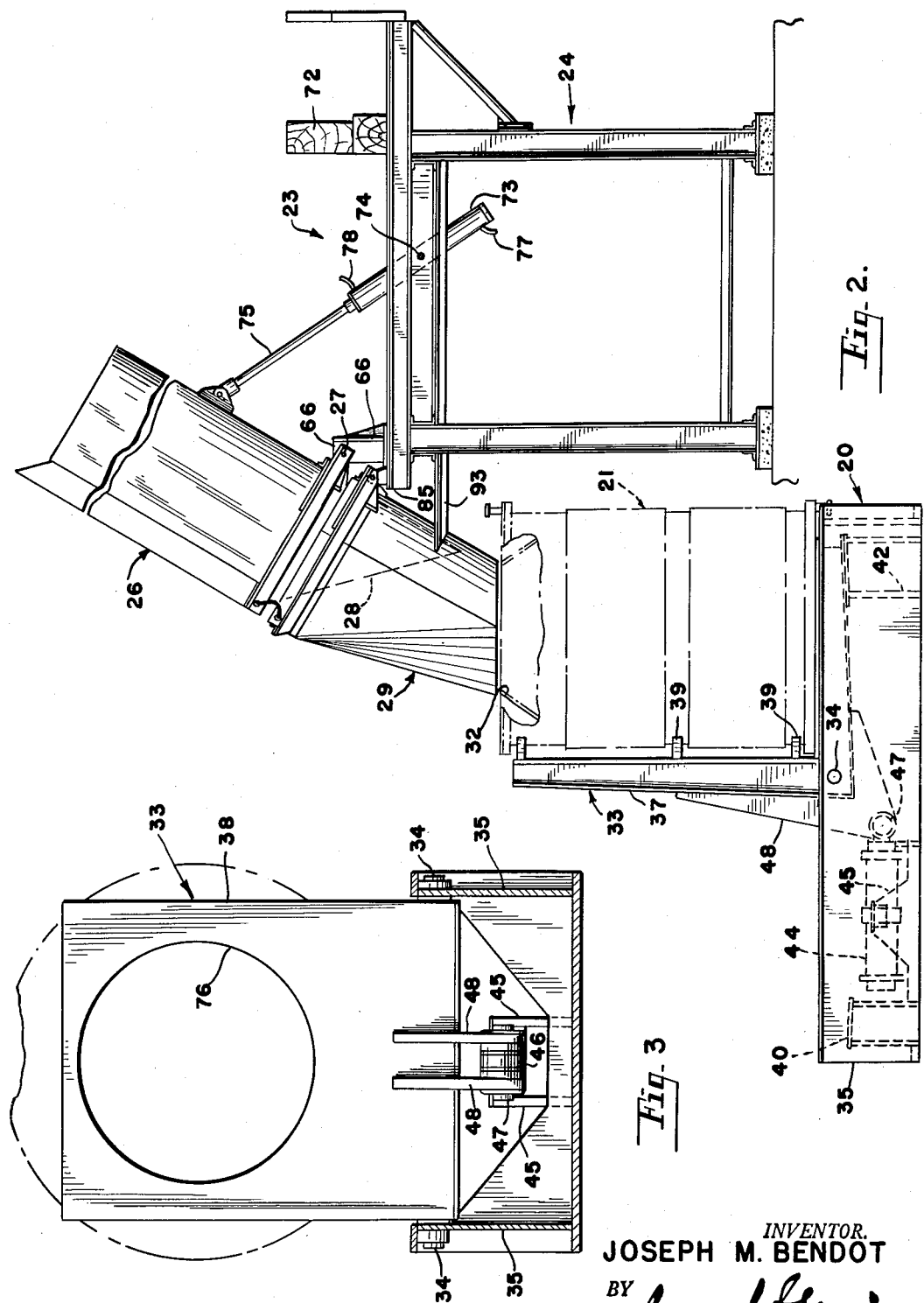
INVENTOR.
JOSEPH M. BENDOT
BY
ATTORNEY May 8, 1956 J. M. BENDOT 2,744,670
APPARATUS FOR FILLING CONTAINERS
Filed May 29, 1952 4 Sheets-Sheet 3
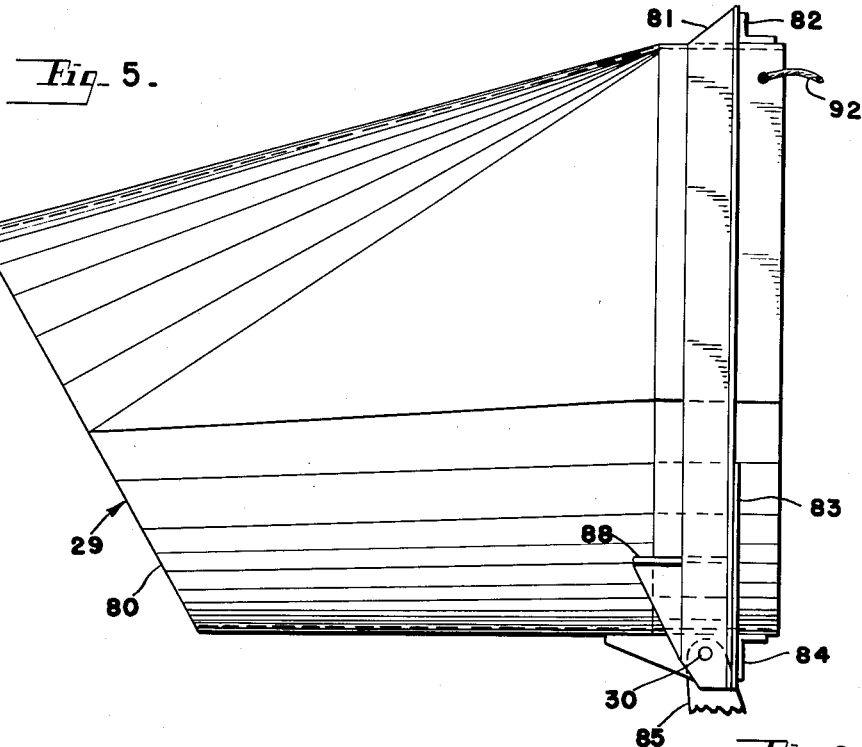
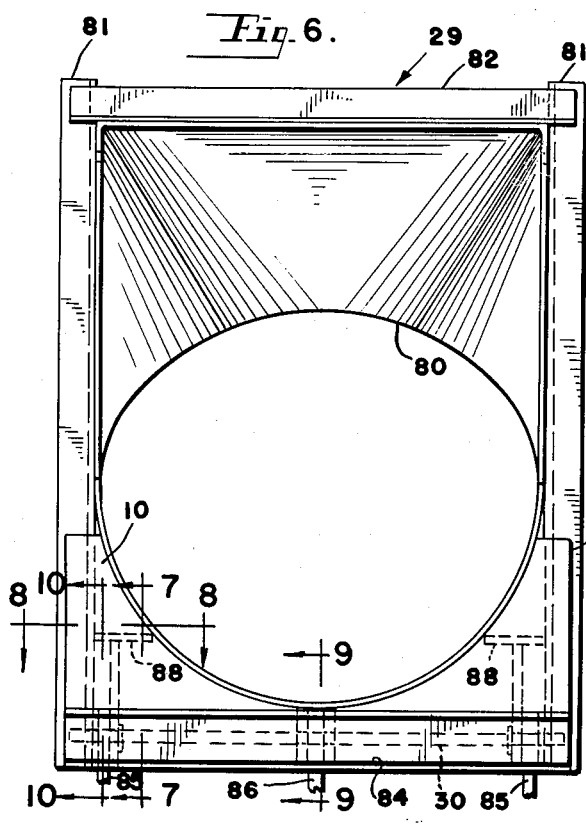
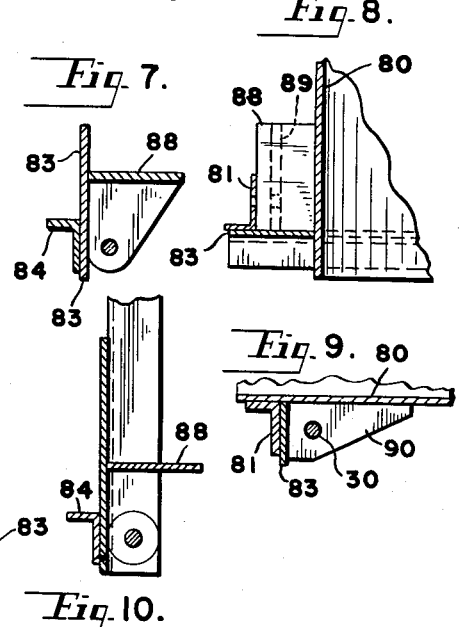
INVENTOR.
JOSEPH M. BENDOT
BY
ATTORNEY

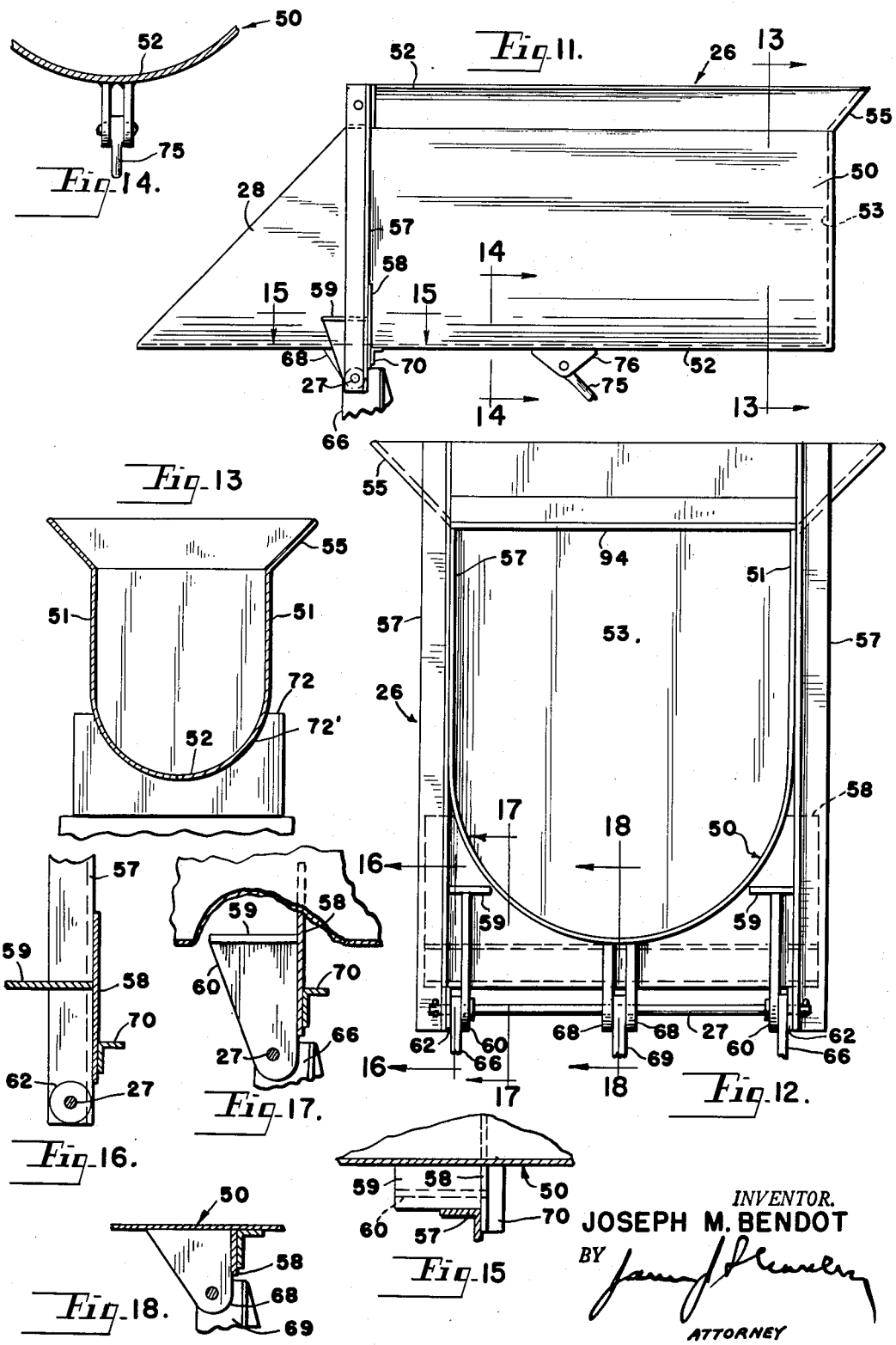

United States Patent Office 2,744,670
Patented May 8, 1956

2,744,670

APPARATUS FOR FILLING CONTAINERS

Joseph M. Bendet, Steubenville, Ohio, assignor to National Steel Corporation, a corporation of Delaware Application May 29, 1952, Serial No. 290,734

9 Claims. (Cl. 226—19)

The present invention relates to apparatus for charging loose divided material into a container and is primarily concerned with apparatus for charging loose scrap metal, such as scrap tinplate, into a drum or other container in which the material is subsequently treated.

The present invention will be described more particularly in connection with the charging of tinplated scrap metal into a drum in which the metal is subsequently chemically tumbled and treated to remove the tin, whereby the tin can be recovered and reused. Such a detinning apparatus and drum are shown and described in copending application Serial No. 295,108, filed June 23, 1952, by C. J. Klein et al. and assigned to the assignee of the present application. The present apparatus is not limited to charging scrap tinplate into a drum and may be used for charging other loose, divided material into other types of containers.

Large quantities of scrap tinplate are produced in the production of tinplated strip and sheets and particularly in the production of electrolytic tinplated strip. A source of a large amount of the scrap is the long thin ribbons of tinplate produced when the edges of electrolytic tinplated strip are trimmed. In order to recover the tin on the scrap, the scrap is chemically treated in a suitable rotating container. The amount of scrap material charged into the container preferably is accurately measured or there will be an excess or insufficient scrap material present in the treating apparatus relative to the amount of chemicals present for removing the tin. In addition, if insufficient scrap is charged into the container, the detinning apparatus is not being used at maximum efficiency, and if too much scrap is charged into the container, the chemical solution will not circulate properly through the scrap and other difficulties may be encountered. The use of large storage and loading bins, such as those used for handling fluent materials like grain, coal, etc. are not satisfactory, as tin scrap usually is either in the form of thin narrow bands or ribbons or in the form of thin regularly or irregularly shaped sheets. These ribbons are readily entwined during handling and under pressure the ribbons are readily deformed with the result that during handling the scrap forms a relatively solid, interlocked mass that is difficult to handle or to flow through chutes. At times, it is necessary to detin relatively large pieces or sheets of tinplate, and these large pieces bend and crumple and tend to clog the passages leading from storage bins.

Accordingly, it is an object of the present invention to provide an improved apparatus for charging loose material into a container that can be operated rapidly and efficiently without clogging or jamming.

Another object of the present invention is to provide an improved apparatus for charging scrap tinplate or other material into a container.

Another object of the present invention is to provide an improved apparatus for charging material such as scrap tinplate in a measured amount into a container for subsequent treatment without undue spillage of the material.

Another object of the present invention is to provide an improved apparatus for charging loose material into a container that includes an improved means for receiving and supporting the container in position to be filled.

These and other objects and advantages of the present invention will become more readily apparent from the following description, taken with the accompanying drawings, in which:

Figure 1 is a side view partially in section of apparatus embodying the principles of the present invention;

Figure 2 is a side view of the apparatus of Figure 1 showing the means supporting a container in position to be filled and showing the means for charging the container in the charging position;

Figure 3 is an enlarged sectional view taken along line 3—3 of Figure 1;

Figure 4 is an enlarged fragmentary view taken along line 4—4 of Figure 1;

Figure 5 is an enlarged side view of the spout shown in Figure 1;

Figure 6 is an end view of the spout of Figure 5;

Figures 7, 8, 9 and 10 are fragmentary sectional views taken along the lines of like number, respectively, of Figure 6;

Figure 11 is an enlarged side view of the tiltable bin shown in Figure 1;

Figure 12 is an enlarged front view of the bin of Figure 11;

Figure 13 is a sectional view taken along line 13—13 of Figure 11 with the bin support shown in Figure 1 being added to Figure 13;

Figure 14 is an enlarged fragmentary sectional view taken along line 14—14 of Figure 11; and, Figures 15, 16, 17 and 18 are fragmentary sectional views taken along the lines of like number, respectively, of Figures 11 and 12.

Referring to the drawings, there is shown at 20 apparatus for tilting and supporting a container or drum 21 which is to be filled with scrap tinplate. At 23 there is shown apparatus for charging the scrap into the container 21 while supported in the charging position by apparatus 20. The charging apparatus 23 includes a supporting framework 24 and a charge holding bin 26 tiltably mounted at 27. A chute 28 extends forwardly from the open end of the tiltable bin 26 and extends into a spout 29 which is in turn tiltably supported at 30 for swinging movement downwardly into position to guide material from the bin 26 into the container 21.

Referring more particularly to Figures 1, 2 and 3, the present apparatus is primarily intended for charging scrap tinplate into a cylindrical container 21, having at one end an opening 32 through which the scrap can be charged into the container. The means 20 for supporting and tilting the container 21 includes a cradle 33 tiltably mounted on shaft 34 mounted in spaced side plates 35. The cradle 33 is substantially L-shaped and includes a substantially horizontal leg portion 37 and a substantially vertical leg portion 38. The leg portion 37 carries a plurality of cross members 39, each having a concave upper surface so that the leg portions and members 39 together support the container 21 on its side as shown in Figure 1. The leg portion 38 extends upwardly and engages the end of the container 21 when the container is placed in position on the cradle. When the cradle is tilted into position for filling, as shown in Figure 2, the leg portion 38 supports the container on end. A support 40 preferably is positioned to engage the leg portion 37 and support the cradle when the cradle is positioned for receiving or discharging a container 21. A second support 42 is provided for engaging and supporting the leg portion 38 when the cradle is tilted to up-end the container into the charging position as shown in Figure 2.

A hydraulic cylinder 44 is tiltably or swingably supported in spaced members 45 and has an outwardly extending piston rod 46 connected at the outer end to a pin 47 mounted in a pair of spaced, bell crank plates 48 attached to the cradle 33. Suitable control means, not shown, is provided for controlling the admission of fluid under pressure to the rod end at 50 to retract the piston rod 46 and tilt the cradle 33 and the container thereon from the position shown in Figure 1 to the position shown in Figure 2. The control means also controls the admission of fluid under pressure to the head end at 51 to move the piston rod outwardly and swing the cradle 33 from the position shown in Figure 2 to the position shown in Figure 1.

Referring more particularly to Figures 1, 2 and 11 to 18, the open bin 26 which receives and holds the material to be charged into the drum or container 21 is tiltably mounted on a shaft 27. The bin includes a sheet metal shell 50 having vertical sides 51 joined by a rounded, substantially semi-circular bottom 52. The rear end of the bin is closed by a plate 53 and the front end of the bin shell extends forwardly at the bottom to form the chute 28. The chute 28 may be a separate member or may be an integral part of the shell 50. The outer end of the chute is at an acute angle to the bottom of the bin so that the lower portion of the chute extends outwardly beyond the upper portion of the chute. A flared apron 55 may extend along the sides and the back end of the bin to facilitate the charging of material into the bin.

Adjacent the forward end of the bin, there is a vertical L-shaped supporting member 57 at each side of the bin. A plate 58 is connected to and extends between the side members 57 below the bin with the plate having an upper concave surface that fits the convex outer surface of the bottom portion 52 of the shell 50. A reinforcing member or plate 59 is connected to each vertical member 57 and to the reinforcing plate 58. A depending bracket member 60 is connected to each member 59 and to the plate 58. Each bracket member 60 is spaced from an inner leg of the respective angle member 57. A heavy washer 62 is fastened to the lower inner end of each upright member 57 to increase the bearing surface on rod 27 and each bracket 60 and upright member 57 are spaced at their lower ends to receive therebetween upper ends of a respective one of the supporting brackets 66 carried by cross member 67 on the supporting framework 24. The rod 27 extends through openings in the upper ends of brackets 66 and also through openings in the lower ends of members 57 and brackets 60. Additionally, a pair of spaced plate members or bracket members 68 are welded to the bottom of the shell 50 and to the mid-portion of the reinforcing plate 58. The brackets 68 straddle a supporting bracket 69 also carried by the member 67 and suitable openings are provided through which the shaft 27 extends. An angle member 70 extends along the lower edge of the plate 58 to additionally reinforce and strengthen the bin supporting structure. Thus, the bin 26 is supported for tilting movement about an axis below and adjacent its forward end.

The back end of the bin is supported by wooden bumper 72. The bumper 72 is supported on the framework 24 and has an upper concave surface 72' to receive the bottom portion 52 of the bin 26. The bumper 72 supports the back end of the bin when it is in the charge receiving or horizontal position. Preferably, the supporting member 72 is formed of wood or other material having some resilience to reduce the shock to the bin when the bin is tilted from the discharging position shown in Figure 2 back to the charge receiving position shown in Figure 1.

Power actuated means are provided for tilting the bin to discharge its contents. A hydraulic cylinder 73 is tiltably mounted on pins 74 in the framework 24. The cylinder 73 has an outwardly extending piston rod 75 connected to bracket 76 on the bottom of the bin 26. Suitable control means, not shown, is provided for admitting fluid under pressure to the head end of the cylinder 73 at 77 to move the rod 75 outwardly and tilt the bin 26 to the position shown in Figure 2 for discharging the material from the bin. The control means also controls the flow of fluid under pressure to the rod end of the cylinder at 78 to return the bin to its loading position shown in Figure 1. When the bin is being returned to the position shown in Figure 1, the flow of fluid out of the head end at 77 may be controlled to cushion the return out of the bin and reduce its impact against bumper 72.

Referring more particularly to Figures 1, 2 and 5 to 10, a swingable spout 29 is provided for guiding the material into the drum 21 through the opening 32. Spout 29 includes a shell 80 that is open at both ends and that may be formed of sheet metal. The outer end of the shell is substantially circular and preferably is not larger than drum opening 32. The back or opposite end of the shell is substantially rectangular in cross-section with a rounded bottom to receive the chute 28. Supporting and reinforcing means are provided adjacent the back end of the spout 29. The reinforcing and supporting means includes a pair of side members 81, a top member 82 connected to and extending between members 81. Each of members 81 and 82 may be an angle member, as shown in the drawings. A reinforcing plate 83 is connected to and extends between the lower end portions of the side members 81 and also supports and reinforces the rounded bottom of the shell 80. A reinforcing member 84 extends along the lower portion of plate 83. The supporting and reinforcing means for the spout also includes means providing bearing surfaces for engaging the shaft 30 which is mounted in a pair of outer end brackets 85 and a central bracket 86 carried by the frame 24. On each side of the spout, there is a plate 88 which is connected to the plate 83 and the respective side member 81. A depending bearing plate 89 is connected to the plate 83 and plate 88 at each side of the spout. The bearing plate 89 is spaced from the inner leg of a respective member 81 so that the members 81 and bearing plates 89 straddle the supporting brackets 85 at each side of the spout and support the spout on the shaft 30. A pair of brackets 90 are fastened to the bottom of the spout and to the mid-portion of plate 83, and these brackets 90 straddle support 86 and are supported on the shaft 30. Thus, the spout is tiltably or swingably mounted on the shaft 30 which is in turn supported below and outwardly of the shaft 27.

At each side of the spout, there is a flexible cable 92 having one end connected to the spout and the other end connected to the bin. The flexible cables 92 are of such a length that when the bin is tilted to the discharging position, the spout will swing downwardly and its outer end will engage the upper end of drum 21 before the bin has been fully tilted to its discharging position. After the spout 29 engages the upper end of the drum 21, the flexible connecting means or cables 92 permit the bin to move relatively to the spout so that when the bin has been moved to its discharging position as shown in Figure 2 the front open end of bin 26 is closely adjacent the rear open end of spout 29 and there is little chance for the material to fall out and onto the floor. In addition, the chute 28 extends into the spout and prevents material from falling down between the ends of the bin and the spout, and carries discharged material into the spout.

Referring more particularly to Figures 1, 2 and 4, it may be undesirable for various reasons to have the end of spout 29 contact the end of drum 21. A bumper 93 may be mounted on the supporting framework 24 in position to engage the spout 29 when swung down to the charging position shown in Figure 2. The bumper 93, instead of drum 21, will act as a stop. In operation, the bumper 93 will engage and hold the spout in the charging position after the bin 26 has been partially tilted. Further tilting of bin 26 to discharge the bin contents will not swing the spout downwardly any further.

Adjacent the forward open end bin of 26, there is an upper cross member 94 which extends across the top of the bin. This cross member 94 is positioned so that when the bin is filled, the forward top portion of the charge is held back by the cross member 94 and the material will have an angle of repose, such that it will not fall out of the spout. The forward face of the charge will be inclined outwardly and downwardly from cross member 94, and the angle of inclination will be such that the bottom of the charge will not extend to the outer lower edge of chute 28. Thus, an operator can fill the bin to the top and the charge will be relatively accurately measured and the material will not fall out of the open end of the bin. If for any reason the operator wants to increase the size of the charge and pile the material up in the bin so that the charge is rounded up above the top of the bin, then the cross member 94 will prevent the material from falling out of the chute and the bin.

As shown more clearly in Figure 3, the normally upright or vertical leg 38 of cradle 33 contains a large opening 96. If after the contents of the container have been suitably processed it is desirable to dump the container contents, then the container can be positioned on the cradle 33 with the opening 32 adjacent the opening 96. The cradle and the container can be tilted to the position shown in Figure 2 to discharge the contents through the opening 32 and opening 96 into a suitable lower receptacle, not shown.

The present apparatus will be located in a mill in which there are heavy cranes. While these cranes will be mentioned in describing the loading and unloading of the apparatus, the cranes have not been shown as they form no part of the present invention and they may be of any suitable type and other types of equipment may be used. A cycle of operations will be described, assuming that there is no drum in position on the cradle 33. By the use of a crane, a drum 21 is placed on the cradle 33 in the position shown in Figure 1. The upper concave surfaces of the cross members 39 will tend to hold the drum in position and prevent it from rolling off of the cradle leg 37. The operator then admits fluid under pressure to the rod end of cylinder 44 at 50 to tilt the cradle on the shaft 34 to the position shown in Figure 2 and in this position the drum 21 is in position for filling with scrap metal.

At a convenient time, scrap metal is placed in the bin 26 while the bin is in the position shown in Figure 1. Any suitable means may be used for filling the bin and, for example, a crane carrying a large magnet may be used. With the charge in the bin 26 and the container in the position shown in Figure 2, the operator then admits fluid under pressure to the head end of cylinder 73 at 77. This raises and tilts the bin 26 on the shaft 27, and as the bin starts to tilt the spout 29 under the influence of gravity starts to swing downwardly toward the position shown in Figure 2. When the spout 29 has swung down to the position shown in Figure 2, the bin 26 is in a position intermediate of those shown in Figures 1 and 2. As the bin 26 continues to tilt, the material in the bin will slide through the open end of the bin and spout 28 and the spout 29 will guide the material through the opening 32 into the container. After the bin has been emptied, the operator admits fluid under pressure to the rod end of cylinder 73 at 78 and also preferably controls the flow of fluid out of the head end of the cylinder 77 to return the bin to the position shown in Figure 1. As the bin 26 starts to tilt downwardly, the spout 29 will remain in the position shown in Figure 2 until the slack is taken up in the flexible cables 92. After the slack in the cables 92 has been taken up, further movement of the bin 26 toward the position shown in Figure 1 swings the spout up and out of the way of the drum 21 so that it can be subsequently moved through an arc.

After the drum has been charged, the operator admits fluid under pressure to the head end of cylinder 44 at 51 to swing the cradle back to the position shown in Figure 1, the loaded drum can then be removed by the crane or other suitable means and the cycle of operations repeated.

While cables 92 have been described for connecting the spout to the bin, other flexible means may be used which will permit relative movement between the bin and the spout. It is quite desirable that such flexible connecting means be provided so that the spout upon tilting of the bin will be positioned for guiding material into the drum before the scrap starts to fall out of the bin. After the spout is in position and its downward movement has been stopped by drum 21 or bumper 93, the bin 26 can then be moved relatively to the spout with the chute positioned in the spout to discharge the material out of the bin and through the spout into the drum or other container. Preferably, the cables 92 or other connecting means are of a length such that the spout is swung upwardly and out of the way as the bin is returned to its normal or charging position shown in Figure 1.

I claim:

1. In apparatus for charging material into a container, the combination comprising supporting means, a tiltable bin mounted on the supporting means in a first position to receive and hold material, the bin having a discharge opening and being tiltable upwardly about a first axis to a discharge position to discharge the material from the bin through the discharge opening, a spout mounted on the supporting means adjacent the bin discharge opening, flexible means connected to the bin and to the spout and holding the spout in a raised position when the bin is in the first position in which the spout extends outwardly away from the discharge opening, the spout being mounted on the supporting means for swinging movement downwardly about a second axis parallel to the first axis to a charging position for guiding material discharged from the bin into the container, power actuated means on the supporting means and connected to the bin for tilting the bin upwardly about the first axis to the discharge position whereby the spout swings downwardly about the second axis to the charging position so that the material is discharged from the bin and through the spout into the container, and stop means in position to engage the spout when the spout is in the charging position for preventing the spout from swinging downwardly past the charging position, the flexible means having such a length that the spout engages the stop means before the bin is fully tilted to the discharging position.

2. In apparatus for charging material into a container, the combination comprising supporting means, a tiltable bin mounted on the supporting means in a first position to receive and hold material, the bin having a discharge opening and being tiltable upwardly about a first axis to a discharge position to discharge the material from the bin through the discharge opening, a spout mounted on the supporting means adjacent the bin discharge opening, flexible means connected to the bin and to the spout and holding the spout in a raised position when the bin is in the first position in which the spout extends outwardly away from the discharge opening, the spout being mounted on the supporting means for swinging movement downwardly about a second axis parallel to the first axis to a charging position for guiding material discharged from the bin into the container, power actuated means on the supporting means and connected to the bin for tilting the bin upwardly about the first axis to the discharge position whereby the spout swings downwardly about the second axis to the charging position so that the material is discharged from the bin and through the spout into the container, and a bumper on the supporting means spaced below the spout in position to engage and support the spout when the spout is in the charging position for preventing the spout from swinging downwardly past the charging position, the flexible means having such a length that the spout engages the stop means before the bin is fully tilted to the discharging position.

3. In apparatus for charging material into a container having an opening through which material may be charged, the apparatus comprising, in combination, container supporting means including a cradle in a first position to receive such a container, the cradle being tiltable to a second position in which the cradle supports the container in position for receiving material through the opening, and power actuated means operable to tilt the cradle to the first and second positions; a tiltable bin mounted on supporting means in a receiving position for receiving and holding material, the bin having a discharge opening adjacent the forward end and being tiltable upwardly about a first axis adjacent the forward end from the receiving position to a discharge position to discharge the material from the bin through the opening, a spout supported for swinging movement about a second axis parallel with and below the first axis; flexible means connected to the bin and to the spout at points above the axes and holding the spout in a raised position extending outwardly from the discharge opening and outwardly from the second axis whereby gravity urges the spout downwardly about the second axis toward a lowered position, a container supported by the cradle means in the second position; a chute on the bin extending forwardly from the discharge opening into the spout, power actuated means connected to the bin rearwardly of the discharge opening for tilting the bin to the discharging position whereby the spout swings downwardly from the raised position to the lowered position; and stop means in position to engage the spout when swung downwardly to the lowered position, the length of the flexible means being such that the spout engages the stop means before the bin has been tilted all of the way to the discharge position.

4. In apparatus for charging loose material into a container, the combination comprising supporting means, an elongated material holding bin having a charge opening at its upper portion and a discharge opening at one of its ends, means for pivotally mounting the bin on the supporting means for upward swinging movement about an axis adjacent its bottom portion and adjacent its one end from a charge position in which the charge opening is directed upwardly to a discharge position in which the discharge opening is directed downwardly and for downward swinging movement from the discharge position to the charge position, a spout having an inlet end and a discharge end, means for pivotally mounting the spout on the supporting means in front of the discharge opening of the bin for downward swinging movement about an axis adjacent its bottom and adjacent its inlet end from a charge position in which the inlet end is in an elevated position to a discharge position in which the inlet end is in a down position and for upward swinging movement from the discharge position to the charge position, power actuated means on the supporting means for swinging the bin between the charge and discharge positions, and means for swinging the spout responsively to swinging movement of the bin including a connection between the bin and the spout.

5. The apparatus for charging loose material as defined in claim 4 in which the connection between the bin and the spout comprises a flexible connection to allow relative movement between the bin and the spout.

6. The apparatus for charging loose material as defined in claim 5 which includes a chute at the one end of the bin extending outwardly from the discharge opening into the spout for guiding material discharged from the bin into the spout.

7. In apparatus for charging loose material into a container, the combination comprising supporting means, an elongated material holding bin having a charge opening at its upper portion and a discharge opening at one of its ends, means for pivotally mounting the bin on the supporting means for upward swinging movement about a first axis adjacent its bottom portion and adjacent its one end from a charge position in which the charge opening is directed upwardly to a discharge position in which the discharge opening is directed downwardly and for downward swinging movement from the discharge position to the charge position, a spout having an inlet end and a discharge end, means for pivotally mounting the spout on the supporting means in front of the discharge opening of the bin for downward swinging movement about a second axis adjacent its bottom and adjacent its inlet end from a charge position in which the inlet end is in an elevated position to a discharge position in which the inlet end is in a down position and for upward swinging movement from the charge position to the discharge position, the second axis being parallel to and spaced from the first axis, power actuated means on the supporting means for swinging the bin between the charge and discharge positions, and means for swinging the spout responsively to swinging movement of the bin including a connection between the bin and the spout.

8. The apparatus for charging loose material as defined in claim 7 in which the connection between the bin and the spout comprises a flexible connection joined to portions of the bin and the spout located above the first and second axes.

9. The apparatus for charging loose material as defined in claim 7 in which the connection between the bin and the spout comprises a flexible connection to allow relative movement between the bin and the spout and which includes stop means for limiting downward swinging movement of the spout before the bin is swung upwardly into its discharge position.

References Cited in the file of this patent

UNITED STATES PATENTS

| 1,575,233 | Stillman | Mar. 2, 1926 |
| 2,241,509 | Graves | May 13, 1941 |
| 2,495,541 | Nolan | Jan. 24, 1950 |

FOREIGN PATENTS

| 647,977 | France | Dec. 4, 1928 |